W. H. SHINDOLL.
AUTOMATIC TALLY FOR DISPENSING FAUCETS.
APPLICATION FILED MAY 22, 1920.

1,396,536.

Patented Nov. 8, 1921.
2 SHEETS—SHEET 1.

INVENTOR
William H. Shindoll
BY HIS ATTORNEYS

W. H. SHINDOLL.
AUTOMATIC TALLY FOR DISPENSING FAUCETS.
APPLICATION FILED MAY 22, 1920.

1,396,536.

Patented Nov. 8, 1921.
2 SHEETS—SHEET 2.

INVENTOR
William H. Shindoll
BY HIS ATTORNEYS

UNITED STATES PATENT OFFICE.

WILLIAM H. SHINDOLL, OF ARLINGTON, SOUTH DAKOTA.

AUTOMATIC TALLY FOR DISPENSING-FAUCETS.

1,396,536.   Specification of Letters Patent.   Patented Nov. 8, 1921.

Application filed May 22, 1920. Serial No. 383,361.

*To all whom it may concern:*

Be it known that I, WILLIAM H. SHINDOLL, a citizen of the United States, residing at Arlington, in the county of Kingsbury and State of South Dakota, have invented certain new and useful Improvements in Automatic Tallies for Dispensing-Faucets; and I do hereby declare the following to be a full, clear, and exact description of the invention, such as will enable others skilled in the art to which it appertains to make and use the same.

My present invention has for its object to provide an extremely simple and highly efficient tally intended for general use in connection with dispensing faucets to automatically keep track of the number of times a measuring receptacle is filled from a faucet. More particularly, the invention is adapted for use in connection with a vehicle having an oil tank provided with a plurality of compartments in which different kinds or grades of oil are carried to be delivered to customers in various different quantities, and which compartments are provided with dispensing faucets through which oil is drawn from said compartments to a measuring receptacle suspended from any one of the faucets.

To the above end, generally stated, the invention consists of the novel devices and combinations of devices hereinafter described and defined in the claims.

In the accompanying drawings, which illustrate the invention, like characters indicate like parts throughout the several views.

Referring to the drawings.

Figure 1:
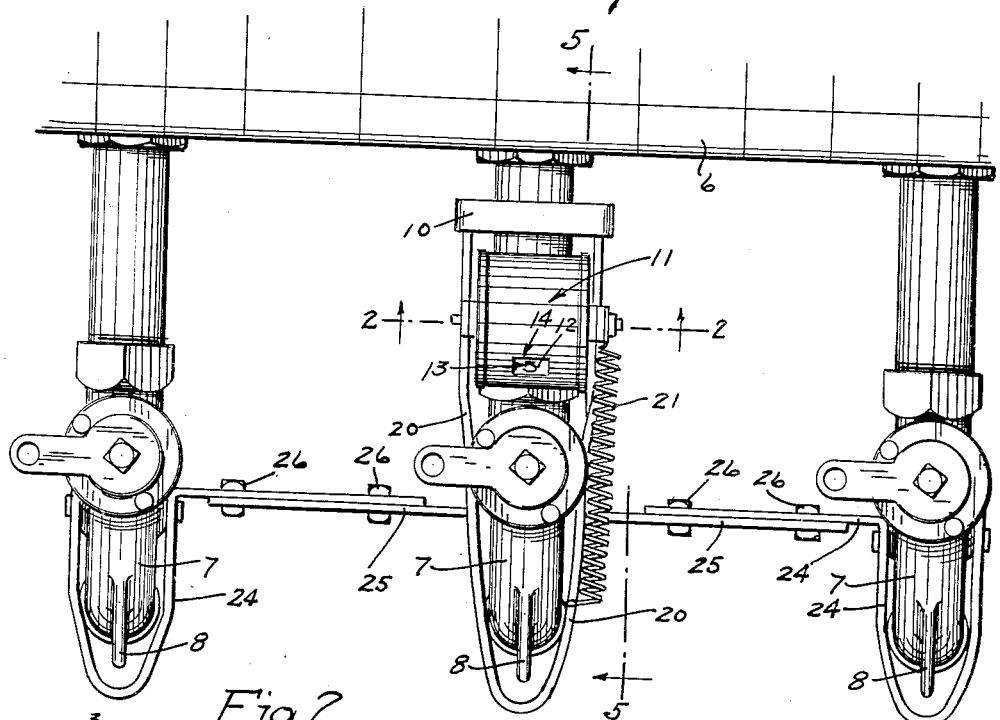
Figure 1 is a fragmentary plan view of an oil tank having a plurality of dispensing faucets, to which the invention is applied.
Figure 2:
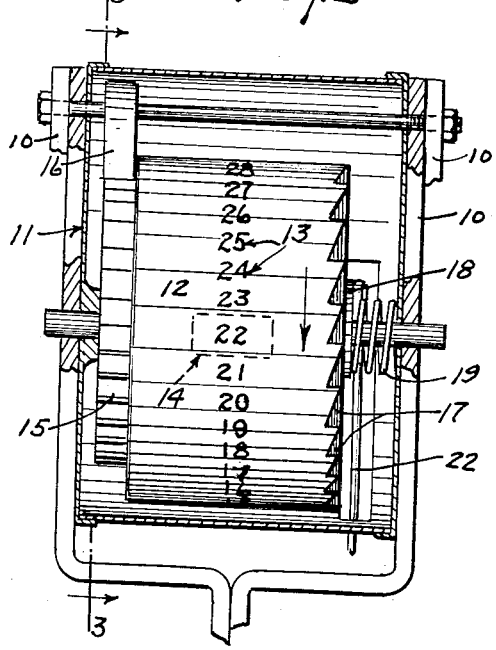
Fig. 2 is a view partly in elevation and partly in transverse section taken on the line 2—2 of Fig. 1, on an enlarged scale.
Figure 3:
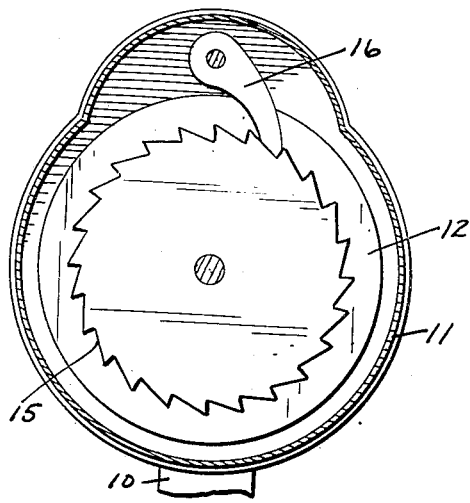
Fig. 3 is a vertical section taken on the line 3—3 of Fig. 2.
Figure 4:
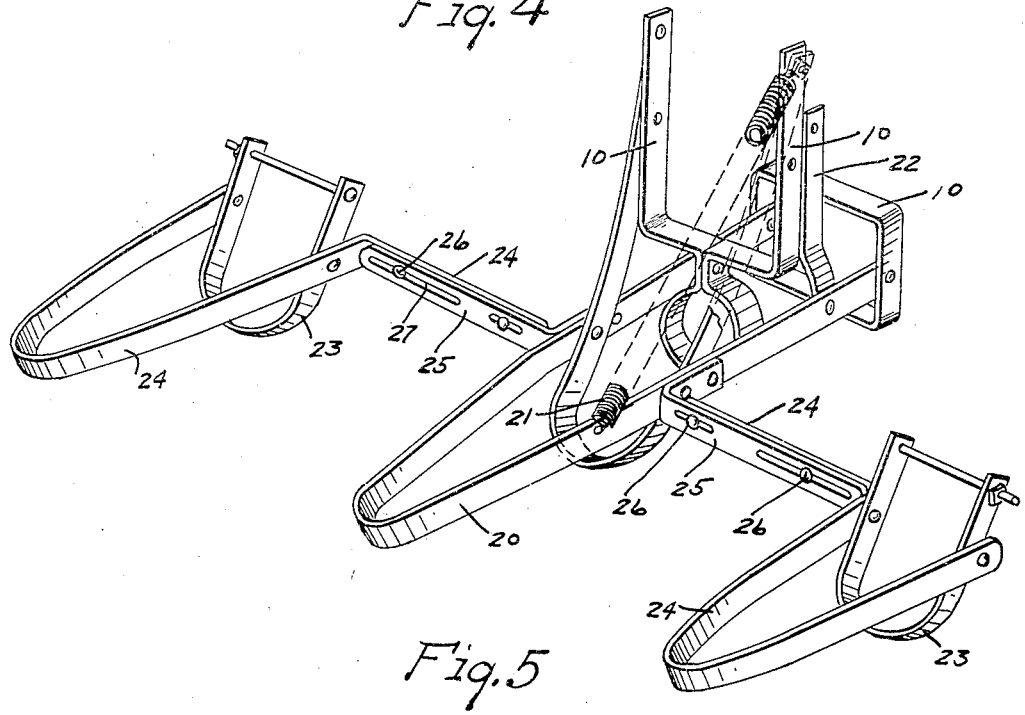
Fig. 4 is a perspective view of the invention, with some parts removed.
Figure 5:
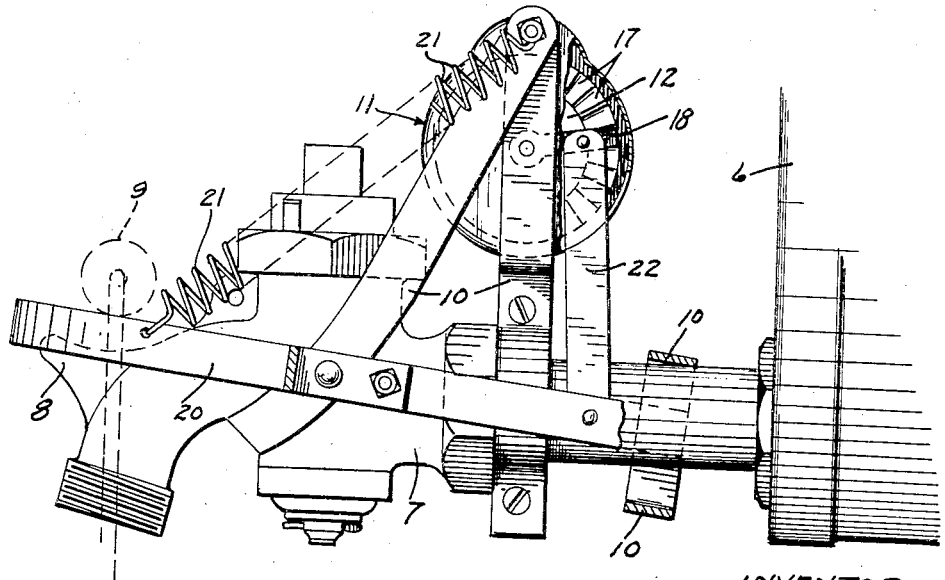
Fig. 5 is a view principally in side elevation with some parts shown in vertical section, taken on the irregular line 5—5 of Fig. 1.

The numeral 6 indicates an oil tank having, as shown, three laterally spaced dispensing faucets 7, each of which is provided with a supporting lug 8 arranged to be engaged by the bail 9 of a measuring receptacle, not shown, to suspend the same under the faucet on which the bail is supported. To the intermediate faucet 7 is detachably secured a bracket 10, which carries a tally comprising a casing 11, in which is journaled a drum 12 having indicated on its periphery circumferentially spaced numerals 13 arranged to pass through the field of a sight opening 14 in the casing 11 during the steps of movement of the drum, as will presently appear.

To yieldingly hold the drum 12 against backward rotation, there is formed on the periphery of the drum, at one end thereof, circumferentially spaced ratchet teeth 15, and a coöperating gravity-held pawl 16 is pivoted to the casing 11. On the other end of the drum 12 are circumferentially spaced ratchet teeth 17, with which coöperates a pawl 18 pivoted on the shaft of said drum with freedom for axial movement and arranged to impart steps of forward movement to said drum to successively bring the numerals 13 into the field of the sight opening 14.

A coiled spring 19, encircling the shaft of the drum 12 and compressed between the pawl 18 and casing 11, yieldingly holds said pawl in interlocking engagement with the ratchet teeth 17.

Horizontally embracing the intermediate faucet 7 is a yoke-like lever 20, the prongs of which extend toward the tank 6 and are fulcrumed to the bracket 10 for vertical oscillatory movement. This lever 20 is yieldingly held raised with its upper edge portion extending above the respective lug 8 by a coiled spring 21 anchored to the bracket 10 and attached to one of the prongs of the lever 20. The pawl 18 is connected by a link 22 to the intermediate portion of one of the prongs of the lever 20.

To each of the outside faucets 7 is detachably secured a U-shaped bracket 23, to which is fulcrumed a horizontally disposed yoke-like lever 24, the prongs of which embrace the faucet to which it is applied. Both levers 24 are rigidly connected to the lever 20 for simultaneous oscillatory movement therewith by extending the inner prongs of said lever laterally into overlapping arrangement with laterally projecting bars 25 rigidly secured to the intermediate portions of the prongs of the lever 20 and detachably connected thereto by nut-equipped bolts 26.

These bolts 26 are extended through bores in the lever 24 and longitudinally extended slots 27 in the bars 25. Obviously, by thus connecting the levers 24 to the lever 20 with freedom for lateral adjustment, the same may be applied to a plurality of faucets set different distances apart.

From the above description, it is evident that when a measuring receptacle is suspended from any one of the faucets by its bail 9, the engagement of said bail with the respective lever 20 or 24 will depress all of said levers and thereby move the pawl 18 to impart a step of movement to the drum 12 and bring one of the numerals 13 into the field of the sight opening 15. When the bail 9 is removed from the faucet on which it is supported, the spring 21 will return all of the levers 20 and 24 to normal position and thereby set the pawl 18 in position to engage the next ratchet tooth 17 to impart a further step of movement to the drum 12 the next time the measuring receptacle is suspended from one of the faucets.

What I claim is:

1. The combination with a plurality of dispensing faucets each having a supporting lug, of a tally having a movable indicating member, a pawl and ratchet for imparting steps of movement to the indicating member, a lever for each faucet, means rigidly connecting the levers, a connection from one of the levers to the pawl, and yielding means normally holding the levers in position to be simultaneously depressed by the bail of a receptacle suspended from any one of the supporting lugs.

2. The combination with a plurality of dispensing faucets each having a supporting lug, of a tally having a movable indicating member, a pawl and ratchet for imparting steps of movement to the indicating member, a lever for each faucet, means rigidly and adjustably connecting the levers, a connection from one of the levers to the pawl, and yielding means normally holding the levers in position to be simultaneously depressed by the bail of a receptacle suspended from any one of the supporting lugs.

3. The combination with a container having a plurality of delivery faucets leading therefrom, of a lever member pivoted to one of said faucets and adapted to support a receptacle for receiving therefrom, yielding means normally supporting said lever, a registering device adapted to be operated by said lever when it is depressed and lever members secured to the other faucets, and adjustably connected to the first mentioned lever whereby, when any one of said levers is depressed, the registering device will be operated.

In testimony whereof I affix my signature in presence of two witnesses.

WILLIAM H. SHINDOLL.

Witnesses:
 C. P. SWIFT,
 C. J. WOODBECK.